United States Patent [19]

Becker

[11] Patent Number: 4,643,827

[45] Date of Patent: Feb. 17, 1987

[54] FILTER PRESS FOR CAKE FILTRATION

[75] Inventor: Hans F. Becker, Gensingen, Fed. Rep. of Germany

[73] Assignee: Seitz Enzinger Noll Maschinenbau Aktiengesellschaft, Mannheim, Fed. Rep. of Germany

[21] Appl. No.: 752,375

[22] Filed: Jul. 5, 1985

[30] Foreign Application Priority Data

Jul. 7, 1984 [DE] Fed. Rep. of Germany ....... 3425163

[51] Int. Cl.$^4$ .................... B01D 25/12; B01D 25/30
[52] U.S. Cl. .................................. 210/228; 100/197; 210/231; 210/456
[58] Field of Search ............................. 100/196–198, 100/205, 206; 210/224–231, 456

[56] References Cited

U.S. PATENT DOCUMENTS 4,065,390 12/1977 Schneider et al. .............. 210/231 X
4,343,710 8/1982 Shackleton et al. ............ 210/225 X
4,511,469 4/1985 Iwatani ............................. 210/225

Primary Examiner—Peter Hruskoci
Assistant Examiner—W. Gary Jones
Attorney, Agent, or Firm—Becker & Becker, Inc.

[57] ABSTRACT

A filter press, for cake or precoat filtration, including one or more filter units, each of which includes slurry frames, filter plates, and support sheets or surfaces. Each of the filter plates is provided with at least one filtrate discharge, and each support sheet or surface, which is disposed on one side of a given filter plate, has associate therewith one of the slurry frames, which has a filling space which is directed toward the caking side of the support sheet or surface, an upper and lower connection for venting and discharge, and a supply conduit for medium which is to be filtered. Associated with each of the slurry frames is a distribution chamber which communicates with the filling space of one of each of the support sheets or surfaces, which are in a sealed state with the slurry frame via a press border. The communication is established via a partition which borders one of the filling spaces and extends parallel to the support sheet or surface. In the vicinity of the frame, the partition is provided with a fluid opening. The supply conduit has an opening into the center of the distribution chamber, with the opening being directed against an adjacent partition surface, from which it is spaced. While providing for uniform caking of the filtering aid, the filtration output is increased considerably. At the same time, it is possible to remove the filtration residue from the filling spaces while the filter unit remains closed.

13 Claims, 11 Drawing Figures

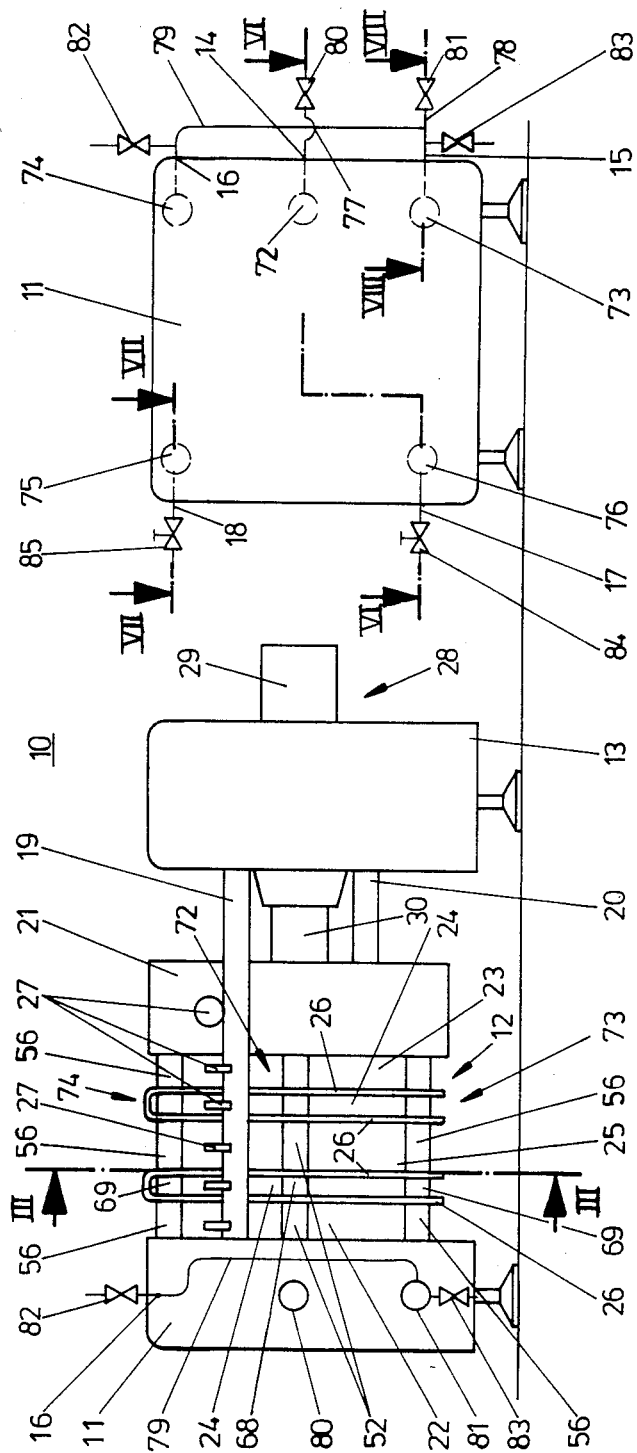

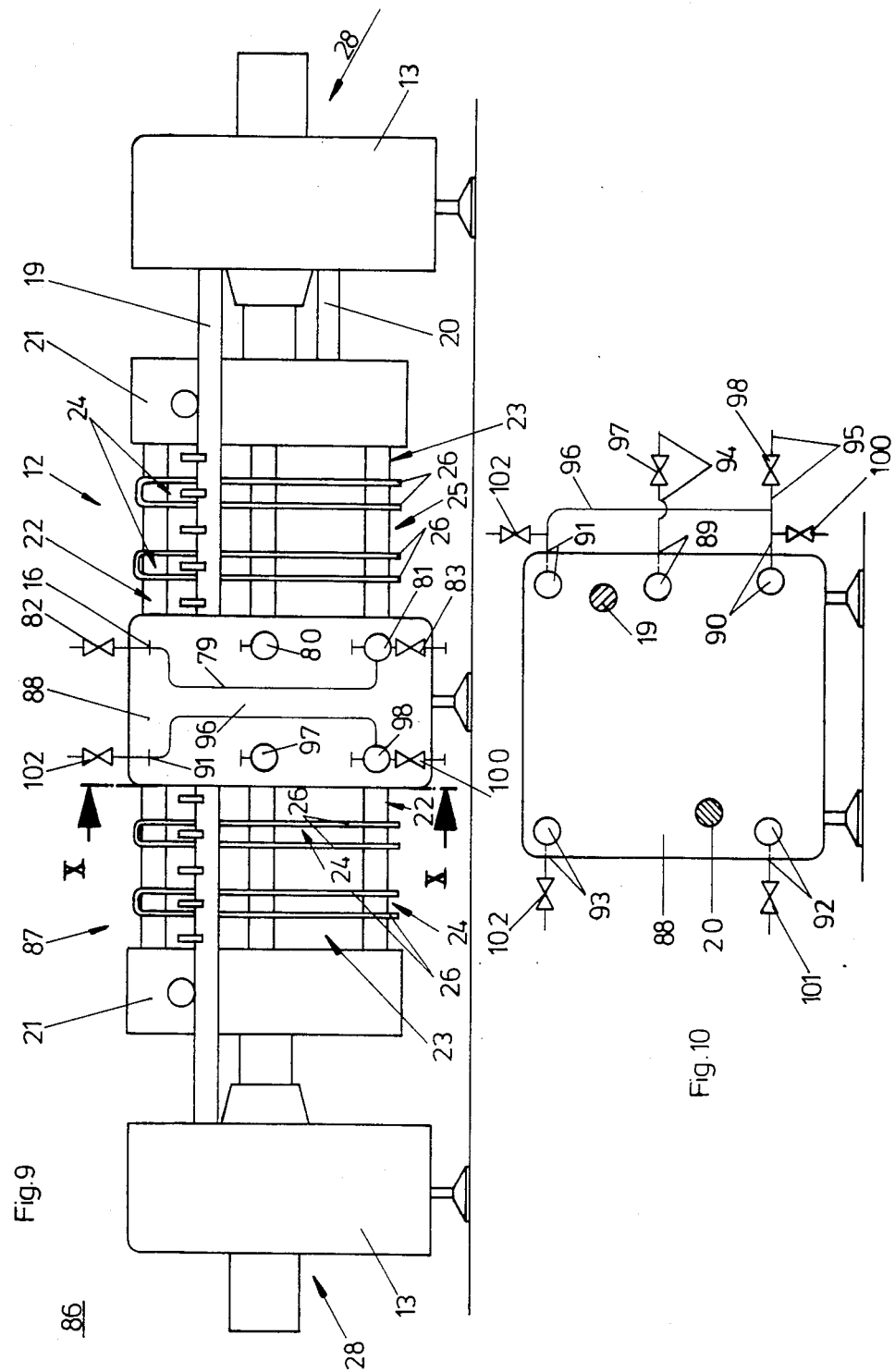

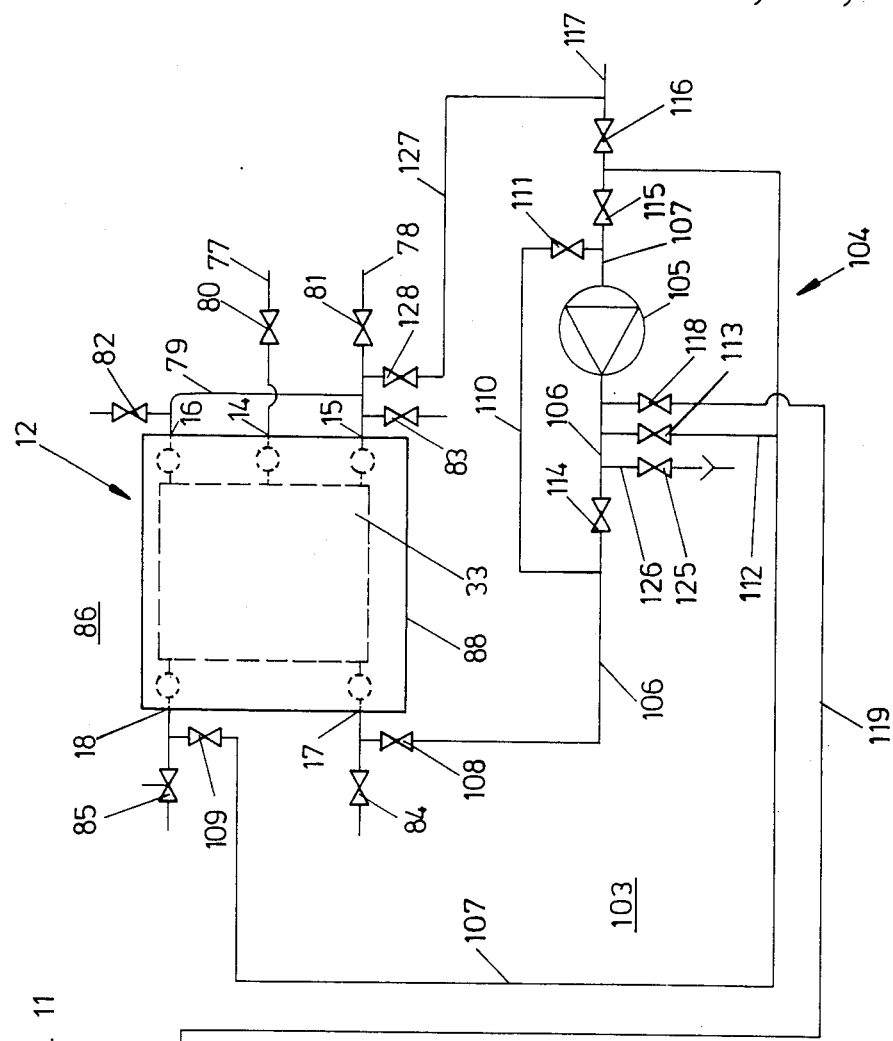
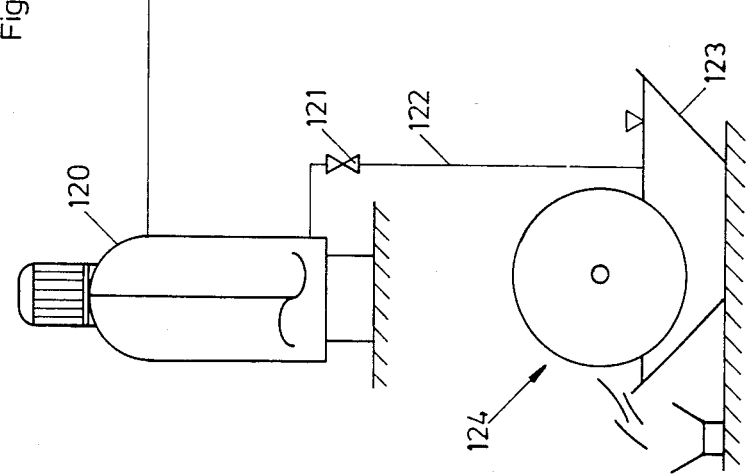
Fig. 11

FILTER PRESS FOR CAKE FILTRATION

BACKGROUND OF THE INVENTION

1. Field of the Invention

The present invention relates to a filter press, for cake or precoat filtration, including one or more filter units, each of which comprises slurry frames, filter plates, and support sheets or surfaces; each filter plate is provided with at least one filtrate discharge, and each support sheet or surface, which is disposed on one side of a given filter plate, has associated therewith one of the slurry frames, which has a filling space which is directed toward the caking side of the support sheet or surface, an upper and lower connection for venting and discharge, and a supply conduit for medium which is to be filtered.

2. Description of the Prior Art

Precautions have already been taken with a filter press of the aforementioned general type in order to optimally design for the formation of turbulence and for the distribution of the filtering aid in the filling space of a given slurry frame of the filter press (see Deutscher Braumeister und Malzmeister, volume Nr. 6, 1983, page 237, right column, and page 238, left column). These precautions consist in replacing the up-to-now large slots for the entry of the medium which is to be filtered into the filling space by a supply conduit having an outlet which comprises small holes; furthermore, special baffle plates are built into the filling space. Although these precautions lead to improved distribution of the filtering aid which is to be caked-on onto the support sheets or surfaces associated with the respective filling space, it is not possible to increase the filtration output of the filter press per m² of the filter surface area by any multiple as a result of the filtering aid caking which is improved by the aforementioned precautions. Furthermore, the limited ability of the filling space of a respective slurry frame to receive material also limits such an increase in output. At increased filtration output, the slurry frame is rapidly depleted, and must thereafter be cleaned each time, for which purpose the filter press must be manually opened, and the residue which fills the respective filling space and is retained by the support sheets or surfaces also must be removed. The maintenance operation increases the filtration time, and is therefore not economically feasible for a filter press which is required to have a high filtration output.

An object of the present invention is to provide a filter press for cake or precoat filtration, which while providing uniform caking of the filtering aid, not only makes it possible, while the filter unit is closed, to remove from the filling spaces the residues, which have caked onto the support sheets or surfaces, and comprise filtering aid and impurities, but also permits a considerably greater filtration output than is possible with previous filter presses of this general type.

BRIEF DESCRIPTION OF THE DRAWINGS

This object, and other objects and advantages of the present invention, will appear more clearly from the following specification in conjunction with the accompanying schematic drawings, in which:

FIG. 1 is a view that shows one inventive embodiment of a filter press having a filter unit;

FIG. 2 is a front view of the filter press of FIG. 1;

FIG. 9 is a view that shows another inventive embodiment of a filter press having two filter units;

FIG. 10 is a view that shows the fixed end plate of the filter press of FIG. 9, and is taken along the line X—X thereof; and FIG. 11 is a diagrammatic view of a rinsing circuit for the filter press of FIGS. 1 and 2.

SUMMARY OF THE INVENTION

Figure 3:
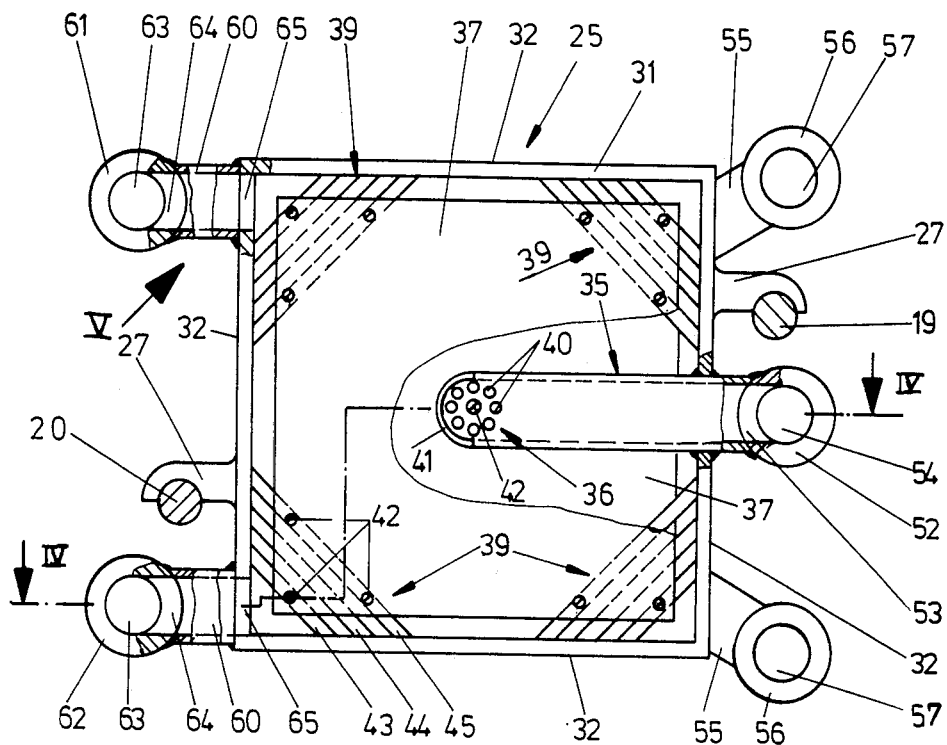
FIG. 3 is a sectional view of the slurry frame of the filter unit of the filter press of FIG. 1, and is taken along the line III—III thereof.

The filter press of the present invention is characterized primarily in that associated with each slurry frame is a distribution chamber which communicates with the filling space of one of each of the support sheets or surfaces, which are in a sealed state with the slurry frames via a press border, by means of a partition which borders on the filling space, extends parallel to the support sheet or surface, and has a fluid opening which is disposed in the region of the slurry frame; the filter press is further characterized in that the supply conduit has an outlet which leads into the center of the distribution chamber and is directed against an adjacent surface of the partition, from which it is spaced, and in that, in order to provide for uniform formation of a cake layer, the cross-sectional area of the fluid opening is greater than the cross-sectional area of the outlet.

With the inventive filter press, it is possible to effectively keep away from the respective support sheet or surface the turbulence which is present to a greater extent; a medium which is to be filtered exits the supply conduit in a quantity which has been increased many-fold, so that a uniform cake layer reliably forms on the support sheet or surface. Furthermore, the inventive association of a distribution chamber with a slurry frame also makes it possible to rinse the residue out of the respective filling space in a short period of time without having to open the filter unit.

Pursuant to advantageous specific features of the present invention, the distribution chamber may be integrated in the slurry frame. With a slurry frame having a press border provided on both sides, and having a distribution chamber integrated in the slurry frame, the distribution chamber is disposed between two partitions which are spaced from one another and border the filling spaces, with the partitions being detachably secured to connection means which are attached to frame pieces; the supply conduit, with the outlet, is guided into the center of the distribution chamber, and the outlet is directed against the adjacent surface of one of the partitions, from which it is spaced. The slurry frame is rectangular, preferably square, and a connection means is provided in the respective corner region of the frame; this connection means at the same time is embodied to increase the bending resistance of the slurry frame.

The supply conduit may have an essentially rectangular cross-section, with each of its wide sides facing a partition. Half of the cross-sectional area of the outlet, which is disposed in the center of the chamber, is disposed on each wide side, and is formed from a number of equal-sized orifices, with the same number of orifices being provided on each wide side. These orifices are uniformly and equidistantly spaced along an at least partial circle which is disposed such that it has a fixed point in the longitudinal axis of the filter unit. The free end of the supply conduit is closed off in a half circle by means of a flat profiled part while maintaining such a space from the respective partition that a throttled fluid flow-through is assured.

A respective conduit member provided with filtrate removal means is secured not only to the top corner region but also to the lower corner region of a slurry frame on the vertical piece of the latter which is provided with the conduit member of the supply conduit; a spacer is interposed between each of the conduit members and the slurry frame. The conduit members provided with the filtrate removal means form horizontally extending filtrate removal channels with the conduit members on the filter plates which are adjacent to the slurry frame. Attached to the upper and lower corner regions on the outside of the other vertical frame part are respective conduit members, which are spaced from the frame part by means of respective tubular pieces. Each of these last mentioned conduit members has an opening leading to the tubular piece, with an opening leading from the tubular piece to the inside of the frame part. Further conduit members on the filter plates adjacent to the slurry frame are associated with the previously mentioned conduit members, with one of the latter, along with one set of the further conduit members, forming the venting channel, and with the other of the previous conduit members, along with the other set of further conduit members, forming the discharge channel of the filter press. The tubular pieces can be embodied as check valves.

The discharge line, along with the discharge channel connected thereto, and the venting line, along with the venting channel connected thereto, may be embodied for connection to a rinsing circuit, which essentially comprises a pump line which is provided with an interposed pump and is connected to a supply line and to a storage tank, which in turn is connected to a separating system, for example a rotary vacuum filter. Connecting means may be provided with which the rinsing circuit can be selectively connected to the venting line of the venting channel as well as to the discharge line of the discharge channel of one of each of the filter units of the filter press, or to the filter units of a number of filter presses. The venting lines and the discharge lines of a filter press having two filter units may be arranged on the fixed end plate which forms the fixed support between the two filter units.

The slurry frame may be embodied as a unit in which the distribution chamber, including partitions, is separated from one or both filling spaces and is independent, with sealing means being provided between the distribution chamber and one or both of the similarly independent filling spaces.

DESCRIPTION OF PREFERRED EMBODIMENTS

Referring now to the drawings in detail, and in particular to FIGS. 1 and 2, the filter press 10 essentially comprises a fixed end plate 11, a filter unit 12, and a cross piece or traverse 13. One narrow side of the end plate 11 is provided with an inlet 14 for the medium which is to be filtered, and two outlets 15, 16 for the filtrate, while the other narrow side of the end plate 11 is provided with a discharge line 17 and a venting line 18. The end plate 11, together with the traverse 13 to which are connected parallel beams 19, 20, are placed on a surface. The filter unit 12 is inserted in the space between the beams 19 and 20. The filter unit 12 is composed of a movable cover 21, the end slurry frames 22, 23, the two filter plates 24, a slurry frame 25, and the support sheets 26. The cover 21, the end slurry frames 22, 23, the filter plates 24, and the slurry frame 25 are provided on both sides with support members 27 by means of which they rest upon the beams 19, 20. Furthermore, the end slurry frame 22 rests against the end plate 11, and the end slurry frame 23 rests against the cover 21. The sealing state of the filter unit 12 is produced by interposing a respective support sheet 26 between the respective end slurry frames 22, 23 and a facing filter plate 24, as well as between the slurry frame 25 and an adjacent filter plate 24, and by the action of a hydraulic closing mechanism 28 which is mounted in the traverse 13 and is provided with a closing cylinder 29 and a piston rod 30 which engages the cover 21. The support sheets 26, which predominantly comprise cellulose material, are joined into a double sheet by means of a ridge which rests upon the filter plate 24.

The filter unit 12, in conformity with the output of the filter press 10, can be provided with any number of filter plates 24 along with the associated slurry frames 25 and support sheets 26. The support sheets 26 can also comprise individual sheets, or can be in the form of support surfaces, which can be produced as fabric, wire cloth or mesh, or the like, and which assure the sealing state with the associated slurry frames and filter plates.

Figure 4:
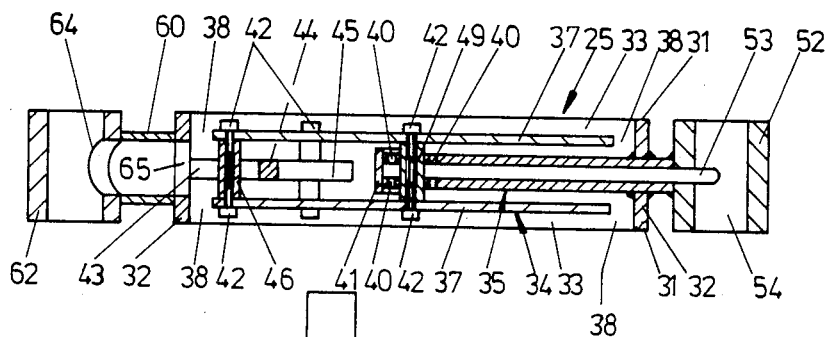
FIG. 4 is a sectional view of the slurry frame taken along the line IV—IV in FIG. 3.

The slurry frame 25 is shown in greater detail in FIGS. 3 and 4. The slurry frame 25 is rectangular, preferably square, and its outer dimensions are adapted to those of the adjacent filter plates 24 of the filter unit 12. The outer limitations of the slurry frame 25 form frame pieces 32 of edgewise-disposed flat-bar steel, expediently stainless steel, with each end face of the frame pieces 32 which face a support sheet 26 being provided with a peripheral press border 31. When the filter unit 12 is closed, the press border 31, along with the support sheet 26 inserted between it and the adjacent filter plate 24, assumes the sealing state at a corresponding press border of the filter plate 24.

Within the space enclosed by the frame pieces 32, the slurry frame 25 is provided with two oppositely located partitions 37 which are parallel to one another. While maintaining a gap 38 which extends circumferentially along the frame pieces 32, and also while being spaced a certain distance above the respectively adjacent press border 31, the partitions 37 are detachably secured with connection means 39 attached to the frame pieces 32. The parallel space maintained between the partitions 37 forms the distribution chamber 34 assigned to the slurry frame 25. As a result of this arrangement of the partitions 37 associated with the distribution chamber 34, there also result for the slurry frame 25 the slurry or filling spaces 33 which are disposed on both sides of the partitions 37. The depth of each of the filling spaces 33 extends from the outwardly directed surface of a partition 37 to the adjacent press border 31. Without maintaining the gap 38 which permits fluid to pass through, the partitions 37 can also end at the frame pieces 32. In this case, the partitions 37 are provided in the vicinity of the frame pieces 32 with a number of openings, for example circular orifices.

In the illustrated embodiment, the connection means for the detachable connection of the partitions 37 expediently comprise three braces 43, 44, 45 in each of the corners of the slurry frame 25. These braces are formed of stainless flat-bar steel, have their wide sides aligned with those wall surfaces of the partitions 37 which face one another, and are centrally secured in the distribution chamber 34 on respectively adjacent frame pieces 32. Mutual and uniform spaces are maintained between the braces 43, 44, 45, the longitudinal sides of which form an angle of 45° with the connected frame pieces 32. In all of the corner regions of the slurry frame 25, the two outer braces 43, 45 are provided with spacers 46 which extend through their wide sides at right angles, are welded therein, and have a length which is adapted to the space of the distribution chamber 34. Each brace 43 is provided with one such spacer 46, whereas the brace 45, and similarly also the central brace 44, are expediently provided with two such spacers 46, although they can also be provided with just a single spacer. The ends of the spacers 46, which project beyond the two sides of the braces, in order to support and secure the partitions 37, are respectively provided with a support or abutment surface 48, and a thread 47 for receiving a bolt 42.

A supply conduit 35 having an outlet 36 at its free end extends into the distribution chamber 34. The horizontally extending supply conduit 35, which preferably has an essentially rectangular cross section, has each of its wide sides facing a partition 37 while maintaining a gap therefrom. The end of the conduit disposed within the distribution chamber 34 is closed off by a piece 41 which has a semicircular cross-section. The outlet 36 of the supply conduit 35 comprises a plurality of circular orifices 40 having the same diameter. The orifices 40, which lead into the interior of the conduit, are disposed in one of the wide sides of the latter and are also uniformly and equidistantly disposed along an at least partial circle having a fixed point in the longitudinal axis of the filter unit 12. To assure that the spaces between the supply conduit 35 and the respectively adjacent partitions 37 are maintained, the conduit is fixed by means of a further spacer 49, which passes through the conduit 35 at right angles thereto and is disposed in the longitudinal axis of the filter unit 12 in the center of the orifices 40. Each of the projecting ends of the spacers 49 is provided with an abutment surface 48 for the partitions 37, and with a thread 47 for a bolt 42. Furthermore, the piece 41 disposed at the end of the conduit 35 projects beyond both wide sides of the conduit, thereby heating a throttled fluid passage between the wide sides and a respectively adjacent partition 37. In addition, the cross-section of the gap 38 is greater than the cross-section of the outlet 36, so that, for example with normally filtratable beer, the flow velocity of the beer as it exits the orifices 40 into the distribution chamber 34 is 0.267 m/sec., and as it exits the gap 38 into the filling space 33 is 0.008 m/sec.

Figure 5:
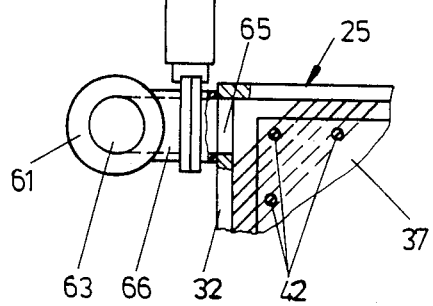
FIG. 5 is a view that shows the region indicated by the arrow V in FIG. 3.

The supply conduit 35, which is conveyed through an opening of the frame piece 32 and is welded therein, is provided with a conduit member 52 at that end opposite the outlet 36. The conduit member 52 is provided with an opening 53 having a cross-section which corresponds to the inside cross-sectional area of the supply conduit 35, and which forms the communication between the latter and the fluid path 54 formed by the conduit member 52. The corner regions of the slurry frame 25 disposed both above and below the conduit member 52 are respectively provided with a conduit member 56 which is provided with filtrate removal means 57. Each canal or conduit member 56 is connected to a spacer 55 which in turn is welded to the outside of a vertical frame piece 32. Furthermore, the outside of the opposite vertical frame piece 32 via the interposition of respective tubular pieces 60, is provided at the upper corner region of the slurry frame 25 with a conduit member 61 which is designed for venting, and is provided at the lower corner region of the slurry frame 25 with a conduit member 62 which serves for discharge. Each channel 63 of the conduit members 61, 62 communicates with that space of the slurry frame 25 comprising the filling spaces 33 and the distribution chamber 34, for which purpose openings 64 in the conduit members 61, 62, and openings 65 in the frame piece 32 lead to the tubular pieces 60. As shown in FIG. 5, in place of respective tubular pieces 60, a single check valve 66 or the like can also be provided, and can, as needed, either be controlled manually or by means of a remotely controlled adjustment member. Those ends of the conduit members 52, 56, 61, and 62 which project out on both sides terminate at the level of the press borders 31 of the slurry frame 25, and are flush with the latter. With regard to the support members 27 provided on the slurry frame 25 for supporting it on the beams 19 and 20, the support member 27 associated with the beam 19 is attached to the outside of one of the frame pieces 32 in the region between the conduit members 52 and 56, and the support member 27 associated with the beam 20 is attached to the outside of the other frame piece 32 in region above the conduit member 62.

Figure 6:
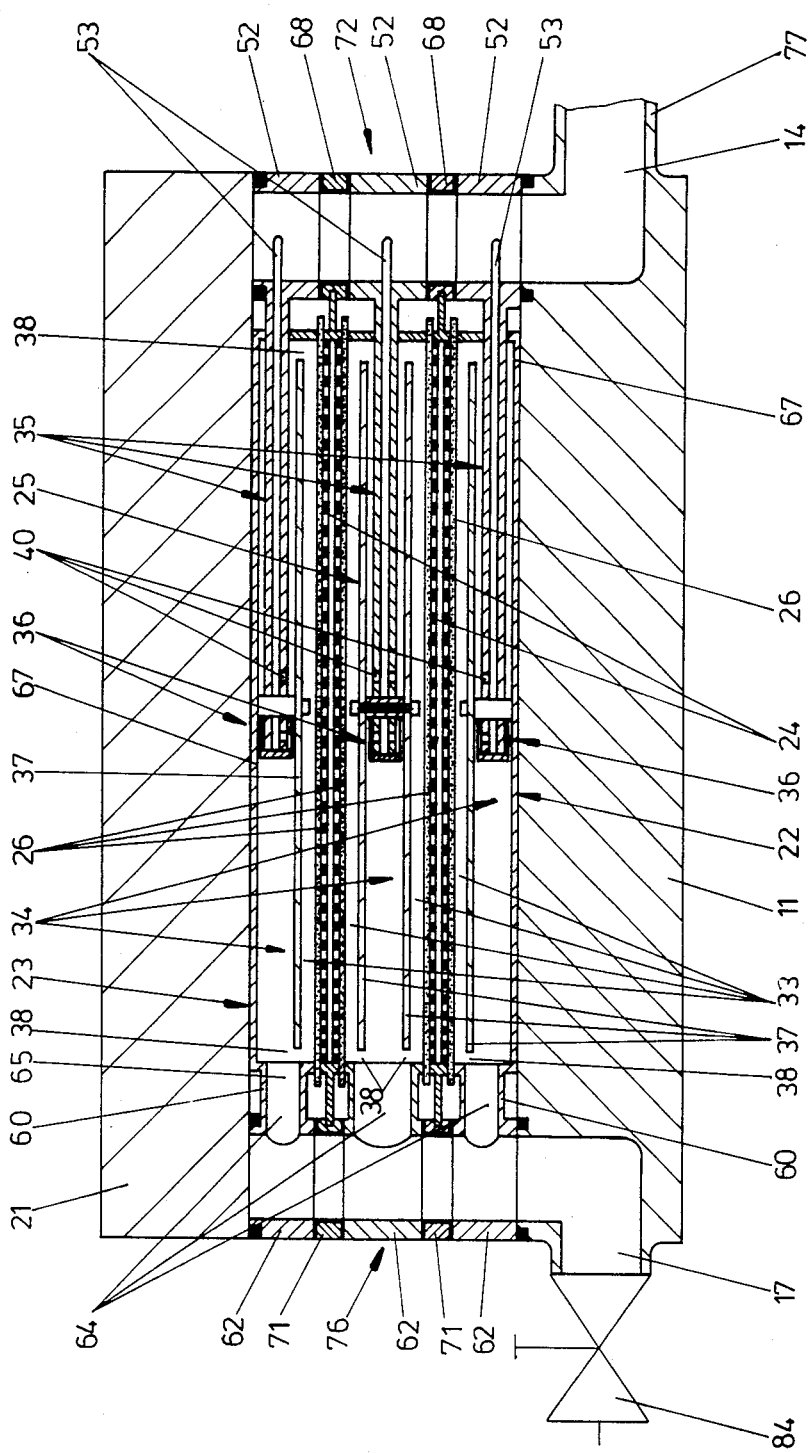
FIG. 6 is a view showing a section through the discharge channel and the supply channel for medium which is to be filtered, and is taken along the line VI—VI in FIG. 2.

As shown in FIGS. 1 and 6, the end slurry frames 22 and 23 of the filter unit 12 essentially differ in construction from the slurry frame 25, which on both sides has pressed borders 31 for the two support sheets 26 which are in a sealed state therewith, in that a press border 31 and the filling space 33 formed in this region are eliminated on that side of the respective end slurry frame 22, 23 which rests against the end plate 11 or the cover 21. The partition 37 which delimits the depth of the eliminated filling space 33 is embodied as an impervious surface 67, extends to the inner side of the frame piece 32, and is fastened there. In so doing, the frame pieces 32 and those ends of the conduit members 52, 56, 61, 62 which project and are directed toward the surface 67, assume the level of the latter and are aligned therewith. By attaching the surface 67 to the inner side of the frame piece 32, the spacers 46, 49, including the bolts 42, which are necessary for the partitions 37 are eliminated. Also eliminated are orifices 40 at the outlet 36 of the supply conduit 35 directed toward the surface 67. The cross-sections of the two tubular pieces 60 respectively provided at the end slurry frames 22, 23 are adapted to the width of the frame pieces 32, which width is reduced due to the elimination of the filling space 33.

The filter plates 24 are provided in a manner known per se on both surfaces with an orifice plate, and the external dimensions of the filter plates 24 are adapted to the dimension of the slurry frame 25 and the end slurry frames 22, 23. The corner regions of the filter plates 24 are similarly provided with conduit members 69-71 which are attached via the interposition of respective spacers 55 to the plate frame. A further conduit member 68 with a spacer 55 is attached at the level of and in alignment with the conduit members 52 to the slurry frame 25, and with the end slurry frames 22, 23 to the plate frame. With regard to the conduit members 68-71, the two conduit members 69 communicate with the interior of the plate in the end region of the plate above and below the conduit member 68 via respective openings 64 and 65 in the conduit member 69 and in the plate frame; for this purpose, the spacer 55 is embodied as a fluid conduit. The remaining conduit members 68, 70, and 71 do not communicate with the interior of the plate via the respective spacer 55.

Figure 8:
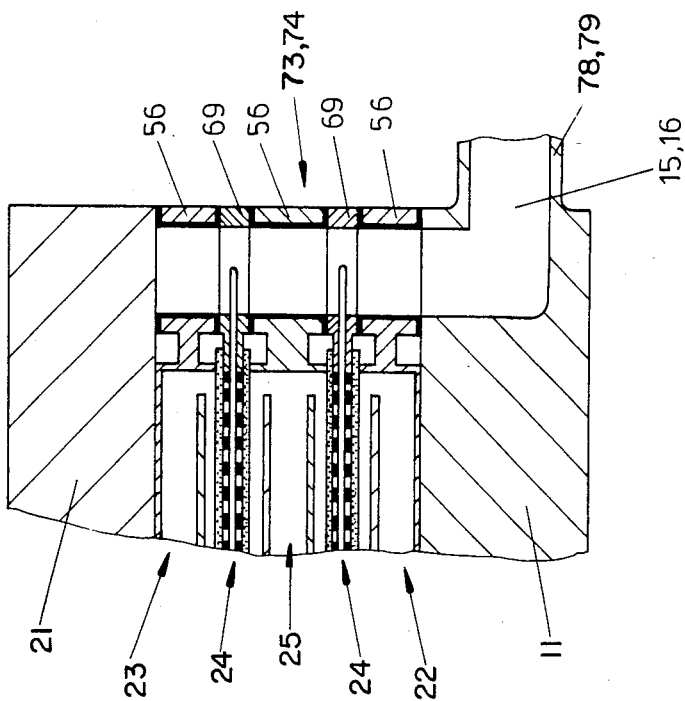
FIG. 8 is a view showing a section through the filtrate removal channel of the filter press, and is taken along the line VIII—VIII in FIG. 2.
Figure 7:
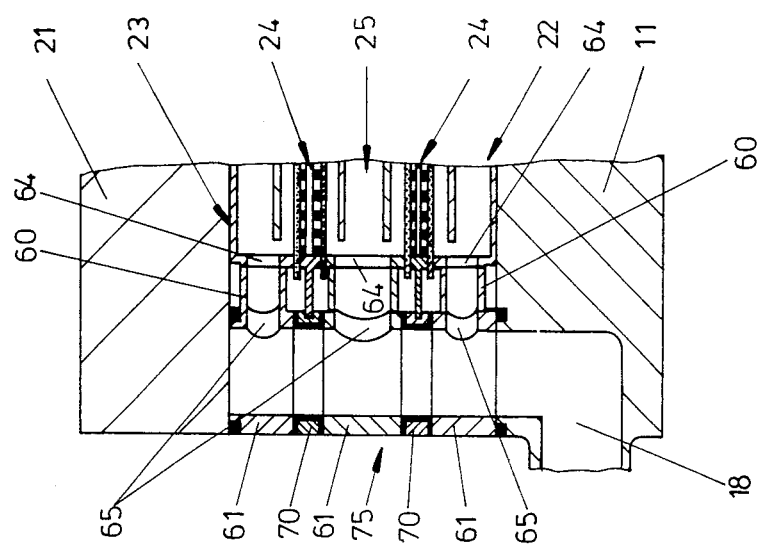
FIG. 7 is a view showing a section through the venting channel of the filter press, and is taken along the line VII—VII in FIG. 2.

In the sealing state of the filter unit 12, the conduit members 52, 56, 61, 62 on the slurry frame 25 and the end slurry frames 22, 23 form continuous closed channels with the conduit members 68-71 which are secured to the filter plates. In particular, as illustrated in FIGS. 6, 7, and 8, the conduit members 52 cooperate with the conduit members 68 to form the supply channel, for medium to be filtered, which can be connected to the inlet 14, the conduit members 56 cooperate with the conduit members 69 to form the filtrate removal channels 73, 74 which are associated with the outlets 15, 16, the conduit members 61 cooperate with the conduit members 70 to form the venting channel 75 which is connected with the venting line 18, and the conduit members 62 cooperate with the conduit members 71 to form the discharge channel 76 assigned to the discharge line 17. Sealing between the conduit members 52, 56, 61, 62, and 68-71 relative to one another and to the end plate 11 and the cover 21 is effected by sealing elements, for example membrane seals with which the conduit members of the filter plates 24 and/or of the slurry frame 25 or end slurry frames 22, 23 are to be provided.

In a different embodiment of the slurry frame 25, of the end slurry frames 22 and 23, as well as of the filter plates 24, the conduit members 56 on the slurry frame 25 and on the end slurry frames 22 and 23, as well as the conduit members 68, 70, and 71 on the filter plates 24, which are not essential for the function of these filter elements to the extent that their spacers 55 provide no communication, can be eliminated in the event that the conduit members 52, 61, 62, and 68 are dimensioned in such a way that they form a closed channel 72, 73, 75, 76 without the interposition of the conduit members 56, 68, 70, 71, which serve merely as connecting means.

As shown in FIG. 2, a supply line 77 is connected at the inlet 14, and a withdrawal line 78 is connected at the outlet 15. A valve 80 is disposed in the supply line 77, and a valve 81 is disposed in the withdrawal line 78. When viewed in the direction of flow, a branch line 79 which leads to the outlet 15 is connected to the withdrawal line 78 prior to the valve 81. At its highest location, this branch line 79 is provided with a valve 82 for pressurizing and venting. The venting line 18 is also provided with a valve 85. For the discharge of filtrate from the filter press 10, a valve is provided between the outlet 15 and the connection of the branch line 79 to the withdrawal line 78. To discharge medium which is to be filtered from the filter press 10, the discharge line 17 is provided with a valve 84.

FIGS. 9 and 10 illustrate a filter press 86 having the previously described filter unit 12 and a similarly constructed filter unit 87. In the filter press 86, a fixed end plate 88 which serves as a common support is disposed between the opposed filter units 12 and 87, which are disposed on the same axis. By means of the beams 19, 20, each of which supports one of the filter units 12 and 87, the end plate 88 is connnected with traverses 13 provided on both sides. Accommodated in each of the traverses 13 is a hydraulic closing mechanism 28 which acts upon the adjacent filter unit 12 or 83. For the filter unit 12, the end plate 88 has the connections provided for the end plate 11 of the FIG. 2, namely the inlet 13 with the supply lines 77 connected thereto and the interposed valve 80, the outlets 15 and 16 including the branch line 79, the withdrawal line 78, and the valves 81, 82, and 83, and the discharge line 17 and venting line 18 together with the valves 84 and 85. Identical connections are additionally provided for the filter unit 87. As shown in FIG. 10, these connections include the inlet 89 with the supply line 94 connected thereto and the interposed valve 97, the outlets 90 and 91 including the branch line 96, the withdrawal line 95, and the valves 98, 99, and 100, and the discharge line 92 and venting line 93 together with the valves 101 and 102.

The previously described filter press 10 operates as follows:

The filter press 10 is first prepared for a cake or precoat filtration, for example to clarify beer. For this purpose, after the support sheets 26 which conform to the character of the beer being clarified are inserted between the filter plates 24 and the adjacent slurry frame 25 or end slurry frames 22, 23, or after the support sheets 26 which are still present from the previous filtration process are cleaned, the filter unit 12 is closed and placed into a sealed state by activating the hydraulic closing mechanism 28, which causes the piston rod 30 to engage the cover 21. The filter press 10 is thereupon not only sterilized with steam or super heated steam, but is also vented via the valves 82 and 85. After a customary precaking or precoating, during which there is formed upon the support sheets 26 a coating comprising a filtering aid, for example diatomite or a mixture thereof, the valves 82-85 are closed and the valves 80 and 81 are opened; in a known manner, beer which is to be filtered and which has been treated with the filtering aid is thereupon supplied via the supply line 77 to the supply channel 72 for medium which is to be filtered (FIG. 6). Via the openings 53, the beer is distributed by the supply channel 72 to the supply conduits 35 respectively associated with the slurry frame 25 and the end slurry frames 22 and 23. The beer subsequently flows out of the orifices 40 of the centrally disposed outlet 36 of the supply conduits 35 into a respective distribution chamber 34 which screens its outlet 36. In so doing, the beer is directed approximately at right angles against that surface of a respective partition 37 of a given distribution chamber 34 which faces the orifices 40. To the extent that the beer can be filtered normally, as it enters the distribution chamber 34 this beer has, for example, a flow velocity of 0.267 m/sec., and flows with decreasing velocity outwardly in the direction toward the frame pieces 32. During its progress, at the slurry frame 25 the beer flows between the two partitions 37, and at the respective end slurry frames 22 and 23 the beer flows between the partition 37 and the surface 67, and also flows around the braces 43-45. Starting from the frame piece 32, at the slurry frame 25 the beer is distributed to the filling spaces 33 disposed on both sides of the distribution chamber 34, and at each of the end slurry frames 22 and 23 is distributed to the filling space 33 associated with the distribution chamber 34. As the beer transfers from a respective distribution chamber 34 to a respective filling space 33, it passes the gap 38 at a flow velocity of 0.008 m/sec, and, after it has flowed through the respective filling space 33, encounters the filtering coating which has precoated the support sheet 26 during the precoating process in a similar flow process. The impurities which are present in the beer and are to be removed, along with the added filtering aid, are collected by and very uniformly deposited on, the coating of the support sheet 26 because the beer is now shielded from the turbulence which occurs as the beer leaves the outlet 36 of the supply conduit 35. The beer which has been clarified by the coating finally passes through the support sheet 26 and the openings of the filter plates 24 to the filtrate removal channels 73, 74, and from there via the outlet 15 and the branch line 79 connected thereto into the withdrawal line 78, which leads to a non-illustrated sterilizing filter or to an intermediate storage tank or the like. As soon as the filling spaces 33 are depleted, they are cleaned and the filter press is again prepared for a caking or precoating filtration as previously described.

The operation described above also applies to the filter press 86, which has the particular advantage that one of the filter units can be used for filtering while the other filter unit is being freed of filtration residue and is being prepared for a subsequent filtration. For this extensively continuous filtration, filtration can occur, for example, via the filter unit 12, which for this purpose is connected to the supply line 77 of a supply line for medium which is to be filtered which is common for both of the filter units 12 and 87, and is also connected to the withdrawal line 78 of a common filtrate removal line. During this time, by closing the valves 97 or 98, the connection of the filter unit 87 to the common supply line or to the common filtrate removal line is interrupted, so that the filter unit can be open for removal of the residue from the filling spaces 33.

The filter presses 10 and 86 permit high filtration outputs per filter area. For example, with beer which can be filtered normally, this output is 30 hl/m$^2$/h. At these high throughput quantities, the filling spaces 33 disposed in the slurry frame 25 or in the end slurry frames 22, 23 fill relatively rapidly with the residue which comprises impurities and filtering aid, and is precoated or caked on the support sheets 26. However, the removal of these residues with the filter unit 12 or 87 opened has the drawback that prior to use, the respective filter unit has to be sterilized again, which requires considerable expense. With the rinsing circuit 103 illustrated in FIG. 11, to which the filter presses 10 or 86 can be connected, it is possible to remove the residues from the filling spaces 33 while the filter units 12 or 87 remained closed, so that afterward there is no need for sterilization. For the circulation rinsing, the discharge connections 17 or 92, the venting connections 18 or 93, as well as the discharge channels 76, including the venting channels 75, of the filter units 12 or 87, are appropriately adapted to the rinsing circuit 103. The latter essentially comprises a pump line 104 with an interposed pump 105, for example a centrifugal pump. The pump line 104, for example with the filter press 86, has its delivery line 106 connected to the filter unit 12 between the valve 84 and the outer wall of the end plate 11 on the discharge line 17, and has the intake line 107 connected to the venting line 18 between the valve 85 and the end plate 11. A valve 108 or 109 is respectively disposed in the connection region of the pump line 104 at the discharge line 17 or the venting line 18 respectively. To reverse the rinsing direction, a by-pass line 110 having a valve 111 leads from the intake line 107 to the delivery line 106, and a connecting line 112 having a valve 113 leads from the delivery line 106 to the intake line 107. A valve 114 is disposed in the delivery line 106 between the connection point of the by-pass line 110 and the connection point of the connecting line 112 to the delivery line 106, and a valve 115 is disposed in the intake line 107 prior to the connection of the by-pass line 110 to the intake line 107. Furthermore, to supply rinsing fluid, for example water, to the rinsing circuit 103, a supply line leads to the intake line 107; this supply line 117 is provided with a valve 116, and is connected to the operational supply system or to some other source. By means of a discharge line 119, which can be switched on or off by means of a valve 118, a storage tank 120 which is equipped with a stirring mechanism is connected to the delivery line 106 between the connection point of the connecting line 112 and the outlet of the pump 105. A discharge line 122 which is provided with a valve 121 is conveyed from the bottom of a storage tank 120 to the filter trough 123 of a rotary vacuum filter 124 having a customary construction. Finally, a drain connection 126, which is equipped with the valve 125, is connected to the delivery line 106 between the valve 114 and the connection point of the connecting line 112.

As needed, with the filter press 86 either the filter unit 12 or the filter unit 87 can be connected to the rinsing circuit 103. For this purpose, with appropriate means, a connection can be made and broken, on the one hand between the discharge line 92 and the intake line 107, and on the other hand between the venting line 93 and the delivery line 106, so that for example during continuing filtration with the filter unit 87, where residues are to be removed from the closed filter unit 12, the rinsing circuit 103 connected to the latter can also be effective for the filter unit 12 of the filter press 10 in the following manner:

With the valves 108, 109 closed, and after the valves 80, 81 are closed and the valves 82, 85 are opened, the filter unit 12 discharges on the filtrate side and on the side of the medium which is to be filtered via the opened valves 83, 84, with venting taking place via the valves 82, 85. Following this discharge phase of the filter unit 12 is a phase which serves to fill the filter unit 12 with rinsing fluid. For this purpose, the valves 82, 83, 84 are closed, the by-pass line 110, the connecting line 112, and the discharge line 119 are disconnected, the drain connection 126 is closed, the valves 108, 116, as well as 114, 115, are opened, and the pump 105 is activated; the water which reaches the intake line 107 via the supply line 117 is distributed to the delivery line 106, the discharge channel 76, and the filling spaces 33 of the filter unit 12 The air which is displaced thereby escapes into the atmosphere via the venting channel 75, the venting line 18, and the valve 85. As soon as only water exits the valve 85, the latter is closed and the valve 109 is opened; after the intake line 107 is filled, the valve 116 is closed, thus interrupting the supply of water to the pump line 104. Subsequently, the rinsing phase commences, during which the rinsing water which is conveyed in the circuit flows through the filling spaces 33 from below toward the top, and for this purpose passes through the delivery line 106, the discharge line 17, and the discharge channel 76 into the filling spaces 33 of the filter unit 12, and is returned to the intake line 107 of the pump line 104 via the venting channel 75 and the venting line 18. In so doing, the layer of residue which has caked onto the support sheets 26 is loosened more and more. The loosening of the residue layer is enhanced still further by reversing the direction of flow at certain time intervals, for example after 15 seconds, so that the rinsing fluid flows through the filling spaces 33 from the top toward the bottom. For this purpose, the valves 114 and 115 are closed, and the by-pass line 110 and the connecting line 112 are connected by opening the valves 111, 113, so that the rinsing fluid passes into the filling spaces 33 via the connecting line 112, the intake line 107, the venting line 18, and the venting channel 75. After flowing through the filling spaces 33, the rinsing liquid reaches the pump 105 via the discharge channel 76, the discharge line 17, the delivery line 106, the by-pass line 110, and the free line section of the intake line 107. As soon as the support sheets 26 are rinsed free after repeated reversal of the direction of flow, the valves 109, 112, 115 are closed, the connecting line 112, the by-pass line 110, and the discharge line 119 are disconnected, the valve 85 is opened, and the pump 105 is activated; the rinsing fluid, along with the residue which it has picked up, is thereupon conveyed via the discharge line 119 to the storage tank 120, the stirring mechanism of which has been activated. During this and other phases of the rinsing circuit 103, care is taken that no unsterile air is drawn in via the valves 82, 85.

Following the rinsing phase, which terminates with the removal, from the rinsing circuit 103, of the rinsing liquid which is loaded with the residue, the rinsing circuit 103 is rinsed with water which is supplied via the supply line 117; the discharge line 119 is disconnected. As water exits the valve 85, the latter as well as the valve 116 are closed, and the water, as was previously described in connection with the rinsing phase, is alternately pumped in both directions through the filling spaces 33, although in this case only one time. Then, with the valves 109, 114, 115 closed, the connecting line 112 disconnected, the by-pass line 110 connected, and the valve 125 opened, the rinsing water is removed from the filter unit 12. The pump 105 is thereupon shut down, the drain connection 126 is closed by closing the valve 125, and the pump line 104 is disconnected by closing the valve 108. A caking or precoating filtration can then again be commenced, and starts in the customary manner with the preliminary precoating. It is expedient to automatically control the phases of the rinsing circuit; for this purpose, the valves would be equipped with remotely controlled adjustment members.

While the stirring mechanism of the storage tank 120 operates, the rinsing liquid conveyed into the latter is supplied via the discharge line 122 to the filter trough 123 of the rotary vacuum filter 124, which separates the residue from the rinse water so that it can be dumped. In place of the rotary vacuum filter 124, it is also possible to use other filters or separating systems, for example whirlpools, cyclones, or other suitable systems.

Using the same manner of operation, the residues from the closed filter unit 87 are removed via the rinsing circuit 103 while at the same time filtration takes place with the filter unit 12.

In order to more rapidly rinse the support sheets 26 free during the rinsing phase, an inert gas, for example carbon dioxide, can be introduced into the pump line 104, and expediently into the pressure connection of the pump 105. In such a case, the rinsing fluid which is loaded with gas must, after it has passed through the filling spaces 33, be degassed in a tank (not illustrated) which is interposed in the pump line 104. The rinsing free can be accelerated, additionally or can be utilized by itself, in that water is supplied to the filter unit on the filtrate side during the rinsing free via a line 127 which leads from the supply line 117 and can be connected to and disconnected from the withdrawal line 78 by means of the valve 128. The water then presses from the filtrate side through the respective support sheet 26, thereby loosening the residue from the latter. It is also possible to individually rinse each slurry frame 25 and end slurry frame 22, 23 of a given filter unit 12 or 87 by utilizing and appropriately controlling the check valves 66.

Pursuant to a further embodiment of the slurry frame 25, the latter can be embodied as a unit in which the distribution chamber 34, including its partitions 37, is separated from one or both filling spaces 33 and is independent, with sealing means being provided between the distribution chamber and the similarly independent filling spaces 33 at the respective point of separation.

The present invention is, of course, in no way restricted to the specific disclosure of the specification and drawings, but also encompasses any modifications within the scope of the appended claims.

What I claim is:

1. A filter press, for cake or precoat filtration, including one or more filter units, each of which comprises slurry frames, filter plates, and support means; each filter plate being provided with at least one filtrate discharge, and each support means, a respective one of which is disposed on one side of a given filter plate, having associated therewith one of said slurry frames, which has a filling space which is directed toward a filter caking side of said support means, an upper and lower connection for venting and discharging, and a supply conduit for medium which is to be filtered; the improvement therewith which comprises:
    press border means for providing a sealed state between each of said slurry frames and the associated support means; a respective distribution chamber being provided for each of said slurry frames; and partitions, which respectively border one of said filling spaces and extend parallel to said support means; said partitions establish communication between said distribution chambers and said filling spaces via respective fluid openings disposed between said partitions and said slurry frames; each of said supply conduits being provided with an outlet into the center of a given distribution chamber, with said outlet being directed against an adjacent partition surface, from which it is spaced, said outlet being formed of a plurality of orifices uniformly spaced from one another over an at least partial circle; in order to provide for uniform formation of a cake layer on the filter caking side of said support means that assures a uniform fully-filtration-effective cake impermeable to undesired beverage-turbidity-causing materials respectively, beverage-damaging materials such as slurry impurities and residue, the cross-sectional area of each of said fluid openings being greater than the cross-sectional area of each of said outlets of said supply conduits.

2. A filter press according to claim 1, in which each of said distribution chambers is integrated in its slurry frame.

3. A filter press according to claim 2, in which a first one of said slurry frames is provided on opposite sides with said press border means; and in which said integrated distribution chamber of said first slurry frame is disposed between two spaced-apart ones of said partitions, which are detachably secured to connection means which in turn are attached to said first slurry frame.

4. A filter press according to claim 3, in which said first slurry frame is rectangular, with one of said connection means being disposed in each corner region of said first slurry frame to also increase the bending resistance of the latter.

5. A filter press according to claim 1, in which a given slurry frame is a unit in which said distribution chamber, including its partitions, is separated from and independent of at least one of said filling spaces; and in which sealing means are disposed between said distribution chamber and at least one of said filling spaces, which are also independent.

6. A filter press, for cake or precoat filtration, including one or more filter units, each of which comprises slurry frames, filter plates, and support means; each filter plate being provided with at least one filtrate discharge, and each support means, a respective one of which is disposed on one side of a given filter plate, having associated therewith one of said slurry frames, which has a filling space which is directed toward the caking side of said support means, an upper and lower connection for venting and discharging, and a supply conduit for medium which is to be filtered; the improvement therewith which comprises:

press border means for providing a sealed state between each of said slurry frames and the associated support means; a respective distribution chamber being provided for each of said slurry frames; and partitions, which respectively border one of said filling spaces and extend parallel to said support means; said partitions establish communication between said distribution chambers and said filling spaces via respective fluid openings disposed between said partitions and said slurry frames; each of said supply conduits being provided with an outlet into the center of a given distribution chamber, with said outlet being directed against an adjacent partition surface, from which it is spaced; in order to provide for uniform formation of a cake layer, the cross-sectional area of each of said fluid openings being greater than the cross-sectional area of each of said outlets of said supply conduits; each of said distribution chambers being integrated in its slurry frame, a first one of said slurry frames being provided on opposite sides with said press border means; said integrated distribution chamber of said first slurry frame being disposed between two spaced-apart ones of said partitions, which are detachably secured to connection means which in turn are attached to said first slurry frame, said first slurry frame being rectangular, with one of said connection means being disposed in each corner region of said first slurry frame to also increase the bending resistance of the latter; said supply conduit having an essentially rectangular cross-section, with each wide side facing one of said partitions; said outlet of said supply conduit being disposed in the center of said distribtuion chamber, with half of the cross-sectional area of said outlet being disposed on each of said wide sides of said supply conduit; said outlet being formed of a plurality of equal-sized orifices, with the same number of orifices being provided on each wide side of said supply conduit; said orifices being uniformly spaced from one another over an at least partial circle having a fixed point disposed on the longitudinal axis of said filter unit; said supply conduit having a free end near said centrally disposed outlet, with a member being provided to close off said free end in a half circle while maintaining from the respective partition a spacing which assures throttled fluid passage.

7. A filter press according to claim 6, in which said slurry frames are provided with vertical frame pieces, on one of which is provided a first conduit member which communicates with said supply conduits; secured to the outer top and bottom corner regions of said same one frame piece, via the interposition of spacers, are respective second conduit members, each of which is provided with filtrate removal means; the filter plates adjacent said slurry frames are provided with third conduit members, which together with said second conduit members form horizontally extending filtrate removal channels; attached to the outer upper corner region of the other of said frame pieces, via the interposition of a tubular piece, is a fourth conduit member, and attached to the outer lower corner region of the other of said frame pieces, via the interposition of another tubular piece, is a fifth conduit member; said fourth and fifth conduit members each communicates with its tubular piece, which in turn communicates with the inside of the associated frame piece; the filter plates adjacent said slurry frames are furthermore provided with sixth and seventh conduit members, which communicate with said fourth and fifth conduit members respectively, with said fourth and sixth conduit members forming a venting channel of said filter press, and said fifth and seventh conduit members forming a discharge-channel of said filter press.

8. A filter press according to claim 7, in which each of said tubular pieces is in the form of a check valve.

9. A filter press according to claim 7, which includes a discharge line which is connected to said discharge channel, and a venting line which is connected to said venting channel; and which includes a rinsing circuit which is connected to said discharge and venting lines; said rinsing circuit essentially comprises a pump line which is provided with a pump and is connected to a supply line and a storage tank, which in turn is connected to a separating system.

10. A filter press according to claim 9, in which said separating system is a rotary vacuum filter.

11. A filter press according to claim 9, which includes at least two filter units; and which includes means for selectively connecting said rinsing circuit to said venting line and said discharge line of one of said filter units.

12. A filter press according to claim 11, which includes two filter units, with a fixed end plate being provided as a fixed support between said filter units; said venting lines and said discharge lines of said filter units are disposed on said fixed end plate.

13. A filter press according to claim 6, in which said first slurry frame is square.

* * * * *